United States Patent [19]

Török et al.

[11] 4,290,894
[45] Sep. 22, 1981

[54] PROCESS AND APPARATUS FOR CLEANING CONTAMINATED WATER

[75] Inventors: Gábor Török; Lajos Sárosi; Ferenc Gróf; Tamás Becsei; Péter Barta, all of Budapest, Hungary

[73] Assignee: Egyesült Müszaki Tömito és Gépszakmai Ipari Szövetkezet, Budapest, Hungary

[21] Appl. No.: 143,771

[22] Filed: Apr. 25, 1980

Related U.S. Application Data

[63] Continuation of Ser. No. 926,122, Jul. 19, 1978, abandoned.

[51] Int. Cl.³ .............................................. D01A 15/02
[52] U.S. Cl. .................................... 210/661; 210/662; 210/795
[58] Field of Search ................ 210/93, 96.1, 274, 275, 210/290, 661, 662, 739, 795

[56] References Cited

U.S. PATENT DOCUMENTS

| | | | |
|---|---|---|---|
| 2,355,564 | 8/1944 | Sebald | 210/20 |
| 3,424,674 | 1/1969 | Webber | 210/80 X |
| 3,436,260 | 4/1969 | Duff | 210/80 X |
| 3,455,819 | 7/1969 | Crits | 210/80 X |
| 3,459,304 | 8/1969 | Brenchler | 210/93 |
| 3,902,996 | 9/1975 | Murkes | 210/20 |
| 4,065,388 | 12/1977 | Flynn | 210/80 |
| 4,113,613 | 9/1978 | Sekoulov | 210/80 X |
| 4,141,824 | 2/1979 | Smith | 210/80 |
| 4,157,959 | 6/1979 | Wen | 210/20 |

*Primary Examiner*—John Adee

[57] ABSTRACT

A process and apparatus for cleaning contaminated raw water, in which raw water and a flocculator are introduced into the reaction space of a pressure vessel, which vessel has such reaction space at the bottom thereof, a filter space above the reaction space and containing a filter made of particles of elastic, granular material, and a clean water space above the filter space so that the raw water passes through the three spaces, whereby the pollution material contained in the raw water becomes enclosed by the cells of the floccules of the flocculator and the floccules become absorbed by the filter particles. Accumulated pollution material is removed from the filter particles by regenerating the filter with a fluid flowing from the clean water space through the filter space into the reaction space. The required extent of purity is achieved by varying the velocity of the raw water introduced into the reaction space, to thereby adjust the percentage of the voids in the filter.

8 Claims, 2 Drawing Figures

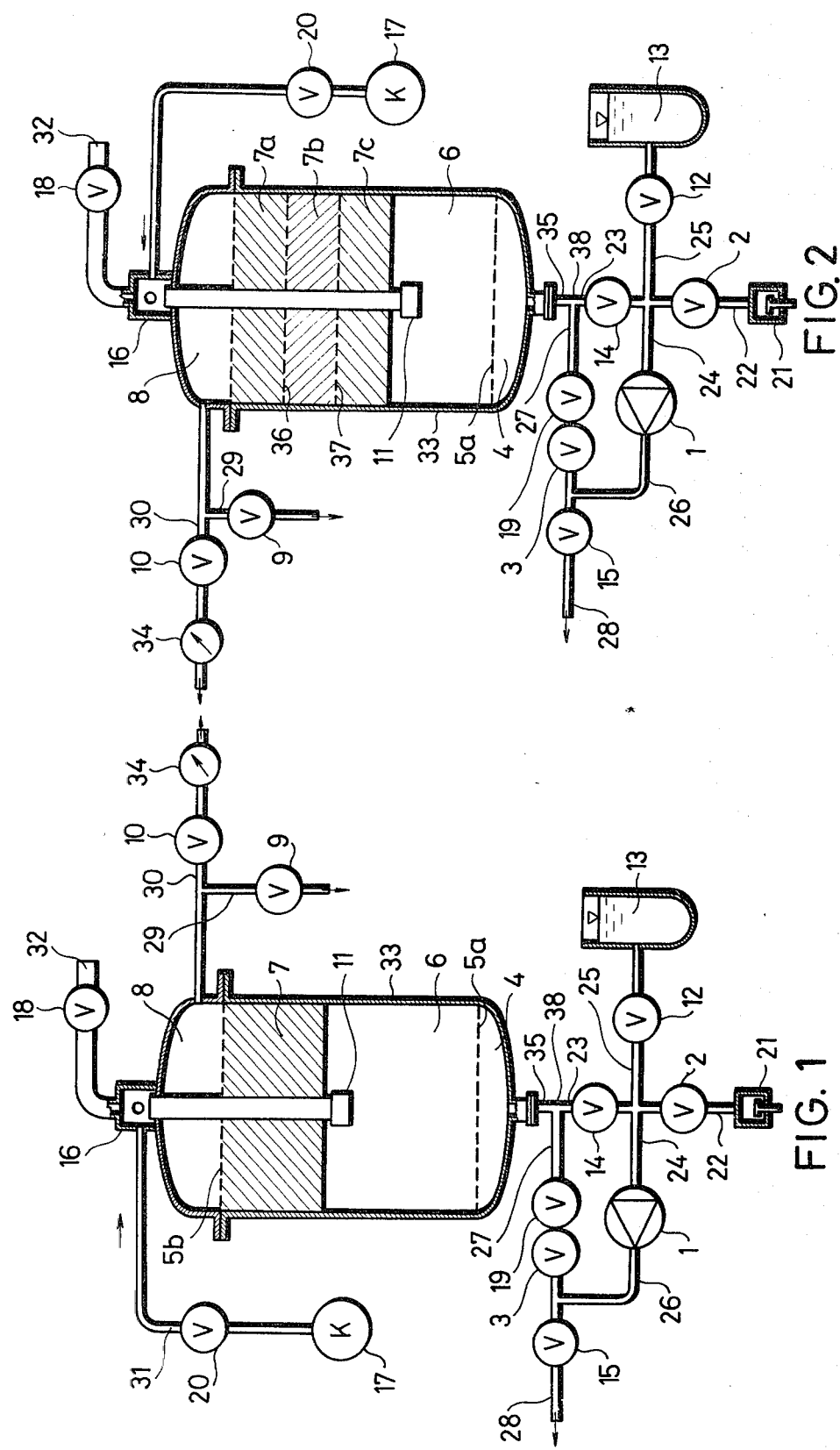

PROCESS AND APPARATUS FOR CLEANING CONTAMINATED WATER

This is a continuation, of application Ser. No. 926,122, filed July 19, 1978, now abandoned.

The present invention relates to a process and an apparatus for cleaning contaminated water, for example to produce drinking or industrial water by removing suspended or emulsified pollution, mainly deoiling sewage.

According to the process of the present invention, the water to be purified is supplied under pressure to a vessel containing filters, a flocculator is supplied to the cleaning space, the grains of the suspended or emulsified pollution are enclosed by the cells created by the floccules, the floccules are brought into the pores of the filter, then the pollution together with the cells of the floccules are removed from the filter by using preferably water and air simultaneously, so that the filter can be used again. The cleaning of the water and regeneration of the filter are done alternately.

The apparatus effectuating the above-mentioned process the subject of the present invention, purifies contaminated water in a vessel by using a flocculator, respectively enclosing the pollution into the cells formed by the floccules then the floccules containing the pollution are absorbed by a filter which preferably can be regenerated, and the filter with the absorbed pollution is removed from the water. In accordance with this the apparatus contains a pressure vessel where the filter can be put and has the so called cleaning space, and has joining pieces for supplying the water to be purified preferably under pressure, for supplying the flocculator and the air, and an outlet for the purified water.

There is often a need in engineering practice to clean contaminated water to produce, for example industrial or drinking water from raw water or to purify industrial sewage at least to a certain extent so as not to damage the life of natural or artificial lakes or rivers.

Theoretically there are three fundamentally different ways to purify liquid: a chemical method, a physical method and the combination of the two. Because of economical considerations, the physical method of purifying is used if possible. The common characteristic of the physical methods is that the water is elutriated and/or clarified, filtered and finally undergoes a certain secondary treatment.

In most cases modern water-cleaning processes avoid the elutriating and clarifying processes and instead the water to be purified is conducted directly through one or two layers of filters while flocculator material is added continuously or intermittently and further materials contributing to flocculation can be added. Flocculators as chemicals are fed into the treating space where during the cleaning process the floccules enclose the undesirable polluting components. After that the floccules and the pollution enclosed by the cells of the floccules can be absorbed by a filter and removed from the water.

With the filtering processes used in practice, sooner or later the filters placed in the treating space become saturated, so that it will not be able to absorb further floccules. Therefore, the filters should be regenerated from time to time. From the point of view of filtering and regenerating the filters can be divided into two groups: bed filters and layer filters.

In the case of bedfilters the water is conducted through the filter which consists of some kind of granular materials, mostly quarzsand, anthracite culm, granulated active carbon or synthetic resin. The thickness of the filter is usually from 1 to 2 m and the velocity of filtering varies between 5 to 15 m/hour. The thickness of the filter layer and the filtering velocity have to be chosen in accordance with the extent and characteristic of the pollution, the period of regeneration and compliance with the requirements of the purified water.

Another type of bed filter is also known in which the filling of the filter is made of porous, elastic synthetic materials. The filling has small synthetic cubes with an edge length of 3 to 5 cm. These sort of filter layers are placed between parting plates preferably between perforated plates and special attention is paid in choosing the dimensions of the pores of the filling. During filtering, the layer is kept compressed because the specific gravity of the filling is less than that of the water, otherwise the material would only untightly fill the filtering space thus enabling the water to flow through the spaces between the particles without resistance, and as such there would be no filtering effect. An advantage of the bed filters is that they can provide good quality filtered water for considerably long time without one having to regenerate its filter since the filtering materials have a high percentage of voids to absorb polluting particles. On the other hand, the disadvantages of the bed filters are that the cleaning of the filter when their pores are choked requires a big amount of purified water, and to loosen the filtering materials we also need compressed air.

Among the above-mentioned disadvantages the purified water demand is more considerable since according to practice sometimes more than 10% of the purified water is lost as sludge. The power consumption in feeding the regenerator fluid is very high, especially in case of very polluted water. Using synthetic materials as the filling of filter makes the problem even more complicated because additional apparatuses are needed to press the filter and for pumping the regenerator fluid. These apparatuses can break down easily.

The other type of filters is the layerfilter. In this case some gelatinous material, for example betonite, siliceous earth or some kind of metal hydroxide is applied on a solid frame which can be porous ceramic, fine woven textile or a metal plate produced by powder metallurgy. The gelatinous materials filter the fluid. Paper can also be taken as traditional layerfilter. The advantage of layerfilters is that fluid can pass through with a considerably higher velocity (15–50 mph) and the quality of the purified water is very good even in the case of thin layers. The disadvantage is, on the other hand, that thin layers get choked very soon, so the period of layerfilters is much shorter than that of bedfilters of the same capacity. Another disadvantage is that active layerfilters cannot be regenerated or the cost of regeneration is extremely high.

A characteristic model of the well-known, up-to-date apparatuses is described in West German Pat. No. 1,922,196. It describes a continuous thickening-pulsating filter. It operates, for instance, with one or two rigid ceramic filter elements. It contains a container to receive and for the diversion of the thickened suspension, a tube for the diversion of the filtered fluid and pulsating chambers on both the input and the output side.

The apparatus works continuously, filtering and regenerating simultaneously. When the filter element is choked, the pressure increases in the pulsating chambers and the high pressure "blows" the polluting particles off the filter element. The effect of the pressure of the pulsating chamber on the output side can also be increased by a compressor.

This pulsating filtering apparatus is suitable for filtering out the suspensions of very polluted fluid and for regenerating the filter elements continuously at the same time. It is advantageous in the sense that the filters are regenerated automatically by the variation of pressure during filtering operation. A disadvantage of this apparatus is that in case of very polluted fluid it needs filters of big surface area so as not to be choked very soon, otherwise the pulsating chambers would work continuously. Another disadvantageous effect is that the filter elements should resist the big variation and reversing of pressure during filtering and regenerating.

If the water is oil-polluted or contains synthetic particles the filters, for example ceramic filters, which can resist the above-mentioned mechanical stresses get choked so much that regeneration by mere mechanical pulsation is impossible. So this apparatus is not suitable for filtering polluted water of that kind.

A simpler construction of cleaning apparatus is described in West German Pat. No. 1,436,294. The fundamental element of the apparatus is a pressure-filter tank which contains a fixed lower filter plate and a hydraulically or pneumatically movable upper filter plate.

During filtering the higher filter plate is pressed on the filter filling placed between the filter plates. During regeneration the upper filter plate is lifted up to make the loosening of the filtering material possible. The filtering material is rigid and its specific gravity is close to that of the fluid to be purified.

This apparatus can be well used when fluid are conducted through filters made of ion-changing synthetic resin. Because of its low specific gravity the filter charge should be compressed. Otherwise it would flow away or would be so loose that filtering would not be effective. During regeneration the filtering charge should be loosened so the upper filter plate must be movable.

Although the principle of this apparatus is correct, it is not advisable to use it for cleaning oil-polluted water. During the filtering period the filtering charge must be very tightly compressed so that it fills out only a small part of the space between the lower and upper filter plates. The filtering is not very effective, and for moving the upper filter plate additional hydraulic or pneumatic apparatus is needed.

Amongh the filtering apparatuses utilizing overpressure is the so called REISERT apparatus which is described for example in the "Hanbuch der Chemischen Technologie." It contains a closed pressure filter tank, a dashpot, a pump for the water and a compressor to produce the pressure of the dashpot. The filter charge is a non-elastic, rigid, granulous material, preferably quarzsand. The filter charge is held on a filter plate mounted with candle filters. Under the filter plate there is another unperforated filter plate.

The filtering is intermittent in the REISERT apparatus. When the filter charge is choked, compressed air is blown into the lower part of the filtering tank. The purified water from the bottom of the tank is suddenly pushed into the material of filter element, so it will be loosened up by the filtered water. When there is no more filtered water in the bottom of the tank the filter is loosened up and cleared of its polluting particles by air.

The pollution can be cleared off by pumping in additional filtered water. The REISERT apparatus is suitable for filtering in all cases when the material of the filter charge is made of inelastic, rigid particles. The effectiveness of regeneration is also very good. On the other hand, it is unfavourable in the sense that regeneration needs a big quantity of filtered water, and additional apparatuses like dashpot or hydropher are needed. In case of an elastic filter charge this apparatus cannot be used.

The purpose of the present invention is a process and apparatus for an effective cleaning of contaminated, oil-polluted water, eliminating the disadvantages of the apparatus known; suitable for always obtaining good quality filtered water; elastic and easily compressible filter layers can be applied; the life of filter charge is long; and regeneration is effective and easy.

The purpose of the invention is also to develop an apparatus which is suitable for cleaning emulsified polluted water by feeding flocculating chemicals in a way that the polluting particles are enclosed by the cells formed by the floccules, the floccules can be educed by the filter charge to reach an arbitrary level of purity and the filter can be regenerated repeatedly for a long time by removing the polluting particles from the surface.

The idea of the invention is first of all based on the perception that the so called layerfilters (filter paper, membranefilters) have high efficiency but their regeneration is very difficult or impossible and the so called bedfilters (sand, gravel, active carbon) can be regnerated simply and easily but they do not filter so effectively. The perception of the idea of the present invention was when we experienced that utilization of completely relaxing materials of high elasticity can provide a process which combines the advantages of the layerfilters and bedfilters. In other words it means that the apparatus effectuating the process filters as layerfilter and can be regenerated as bedfilter. Very good results can be obtained by a filter charge which contains particles of foamed synthetic material of 0.1–25 mm in size.

It also belongs to the perception that—unlike the traditional filtering processes—the filtering is not carried out from the top to the bottom, and the regeneration is not carried out from the bottom to the top, but just the opposite, the flow direction is from bottom to top during filtering and from top to bottom during regeneration. This idea makes it possible to set the effectiveness of filtering and that regeneration does not need the utilization of filtered water.

When the flow direction is from bottom to top during filtering, the filter charge is pressed to the upper filter plate, so the thickness of the layer and its porosity is controlled by the velocity of the fluid. This means that the effectiveness of filtering can be set by the variation of only one parameter.

During filtering the filter works as a layerfilter. When the pores are choked the filter can be loosened by suppressing the flow of water, so the filter is not pressed to the upper filter layer but fills uniformly the whole filtering space. When the filter charge is loosened up it can be regenerated without using filtered water by simply draining off the water from the filter tank. The effectiveness of regeneration can be increased by not simply draining off the water from the filtering tank by making use of the gravity but by sucking out with high velocity using a pump. The effectiveness of regeneration can also be increased by blowing air into the filter charge before or during draining off or sucking out because the particles of the filter charge can be effectively mixed.

In accordance to the aims set, the process according to the present invention for cleaning contaminated water, for example removing suspended or emulsified pollution, mainly to produce drinking or industrial water by deoiling oil-polluted water—at which the water to be purified is conducted preferably under pressure into the filtering tank containing a filter element, flocculator is supplied into the filtering tank, the particles of the suspended or emulsified pollution are enclosed by the cells created by the floccules, the floccules are brought into the pores of the filter, then the pollution together with the cells of floccules can be removed from the filter by using preferably water and air simultaneously—so the filter is suitable for absorbing floccules again, and the cleaning of water and the regenerating of filter is carried out alternately—is based on the fact that the filter which is placed into the filtering space inside the cleaning space is made of elastic particles, the water to be purified flows through the filter from the bottom to the top, the pollution level of the purified water leaving the cleaning space containing the filter or at least the pollution level of the so called first filtered water leaving the cleaning space at the beginning of the process is observed, and the effectiveness of the filtering to achieve the preset level of purity is controlled by the variation of the input flow velocity to the cleaning space, so that the percentage of voids of the filter is adjusted, the polluted filter is regenerated by water flowing down from top to bottom in the filter.

Another criterion of the process according to the invention is that the pollution level of the first filtered and/or the filtered water can be controlled by intermittent sampling or continuous checking by placing a meter into the flow.

The regeneration of the filter element is carried out by draining off the water from the cleaning space once or several times or the water in the cleaning space is sucked down once or several times by a pump. The effectiveness of the regeneration of the filter element during draining off or sucking down from the cleaning space can be increased by pressurized air.

The particles of the filter element are mixed up by the air during regeneration of the filter element, so the pollution is removed from the surface of the filter element, and the waste water coming out of the filter element is also driven out of the tank by air.

In this case compressed air is used to discharge the waste water from the tank, so the waste water and the elastic granulated filter are brought into a vortex motion, so the mixing of the filter element is increased; then at the final stage of the regeneration, the filter element is pressed to the lower filter plate by air and the pollution absorbed by the filter is removed from its pores.

The apparatus according to the present invention for cleaning contaminated water, for example removing suspended or emulsified pollution, mainly deoiling oil polluted water to produce drinking or industrial water—in which the polluted water is cleaned in a cleaning space by flocculator chemicals, or rather by enclosing the polluting particles by the cells formed by the floccules, then the floccules containing the polluting particles are brought into a filter element which preferably can be regenerated and then are removed from the water. The apparatus consists of a cleaning space, a closed pressure tank with a filter element, and joining pieces for supplying the polluted water preferably under pressure, for supplying the flocculator and the air, and an outlet for the purified water—is constructed in such a way that its cleaning space is divided into a lower reaction space, an intermediate filtering space and an upper water space, the filtering space is bordered by lower and upper plates, the inlet of the polluted water and the flocculator and the outlet of the waste water for draining off the pollution is joined to the lower reaction space, the outlet of the purified clean water is joined to the upper water space and the filter element made of elastic granulous material of high percentage of voids is placed into the filtering space.

The apparatus according to the present invention can be characterised furthermore in, that the filter element is an aggregation of porous particles, or the grist of a spongiform, foamed synthetic material.

The filter element preferably contains particles of different size and the size of the particles of the finest fraction is 0.1 mm or bigger while that of the coarsest fraction is 25 mm or smaller.

At a suitable construction of the apparatus both the lower and the upper filter plates are fixed in the cleaning space of the tank.

The inlet duct of the raw water, the inlet duct of the flocculator and the outlet duct of the sludge containing the pollution are preferably combined into one common duct for charging and draining.

In another possible construction of the apparatus, the filter element is divided into layers by preferably perforated plates. The perforated plates are fixed into the tank.

The process and the apparatus according to the present invention have a number of technical and economical advantages compared to prior art apparatuses for cleaning water. The most important technical advantage is that it enables the cleaning of oil polluted sewage or other fluid containing emulsified pollution which has not been sufficiently solved. Moreover it not only enables the cleaning of this sort of sewage, but makes it much faster and more effectively. The filtering velocity of the traditional filter is about 5–16 m/h, whereas the filtering velocity of the process and the apparatus according to the present invention can reach 35–100 m/h.

Another technical advantage of the apparatus is that the flocculating process needed for removing suspended and emulsified pollution takes place in the apparatus itself. Extremely advantageous—as well as from an economical point of view—is that regeneration does not need purified water, and effective regeneration can be achieved by merely draining the water off from the tank. Moreover it is also advantageous that the apparatus can easily be fully automated. Since filtering velocity is high, the capacity of the apparatus is higher than that of the prior art apparatuses, so that its specific installation cost is considerably lower.

The construction of the apparatus and the basic idea of the process have a number of other advantages. Since for example the lower and upper filter plates do not move, both during the filtering and regeneration, the apparatus can be very simple. It is advantageous that the filter charge is not only loosened but also stirred by the introduced air, so that pollution is removed from the surface of the filter easily. It is also possible in the second phase of regeneration to press the filter charge against the lower plate by using the introduced—in this case—compressed air, so that the pollution is pressed out of the pores of the particles of the filter. As a consequence of the elasticity of the filter, it is suitable for absorbing pollution as a sponge when filtering and releasing it during regeneration, especially when it is compressed.

A very important advantage of the apparatus compared to any other traditional filters is the effectiveness of filtering, that is to say, the extent of purity of the purified water can be controlled by the porosity of the filter, by adjusting the velocity of the fluid. Since regeneration is carried out by raw water extra apparatus is not needed, the size of the apparatus is small because of high filtering velocity, so a considerable sum of money can be saved at the time of installation.

It is also advantageous that the filter cannot only be loosened but be brought into a vortex motion and stirred thoroughly by introducing compressed air, so regeneration is faster and more intensive. It cannot be neglected too that theoretically the filter can be regenerated for an uncountable number of times, so its duration is practically unlimited.

The invention will now be described in greater detail by the use of examples with reference to the accompanying figures of which:

FIG. 1 is a schematic figure of a possible construction of the apparatus according to the invention, FIG. 2 shows the same apparatus with a variation of the tank construction.

The main part of the apparatus is the tank 33 in which a lower filter plate 5a and an upper filter plate 5b are fixed. The cleaning space in the tank 33 is divided into three separate spaces by the lower filter plate 5a and the upper filter plate 5b. These are the reaction space 4, the filtering space 6 and the upper water space 8. The filter 7 is put into the filtering space 6. The filter 7 is shown compressed on the figure as it is during the filtering process when it is pressed to the upper filter space 5b by water introduced at the bottom of the tank and fills only the upper part of the filtering space 6.

FIG. 1 shows a suitable construction of the apparatus with an inlet duct 22 for the raw water, an inlet duct 33 for the flocculator and an outlet duct 28 for the sludge containing the pollution, all combined into one common duct 35 for charging and draining.

On FIG. 1, raw water enters the apparatus through foot valve 21, then flows through the duct 22 and the inlet valve 2 toward the combined suction duct 24. The combined suction duct 24 carries not only the raw water, but also the flocculator arriving from the flocculator tank 13 through the flocculator proportioning valve 12 and the duct 25.

The combined suction duct 24 is connected to the pump 1 which pressurizes the raw water containing the flocculator. Then the raw water flows toward the combined duct 35 for charging and draining through the combined delivery duct 26, the discharge valve 3 and delivery duct 27. The delivery duct 27 preferably contains a control valve 19 for controlling the porousity of the filter 7, that is the effectiveness of filtering by adjusting the velocity of the raw water.

FIG. 1 also shows that the sludge duct 23 containing a suction valve 14 is connected to the lower junction 38 of the combined duct 35 for charging and draining. For regenerating the filter 7, the sludge is drained off the tank 33 through the sludge duct 23 containing the suction valve 14.

During regeneration the sludge flows through the combined suction duct 24, the pump 1 and through the combined delivey duct 26 to the discharge valve 15 and then flows out of the apparatus through sludge delivery duct 25. In this case the inlet valve 2, the flocculator proportioning valve 12 and the discharge valve 3 are in closed position.

During filtering the raw water enters the tank 33 at the bottom, then flows through the filter 7 placed into the filter space 6 between the lower and upper filter plates, then enters the water space 8, and the purified water leaves the tank 33 through the discharge duct 30. The discharge duct 30 preferably contains an outlet valve 10 which is opened only when the so called first filtered water at the first stage of filtering has flowed out of the apparatus through the outlet duct 29 and outlet valve 9.

When the so called first filtered water has left the apparatus, the effectiveness of filtering can be checked by testing the purified water leaving the apparatus through the discharge duct 30. When deoiling oil-polluted water an instrument 34, for example oiltester, can be built into the discharge duct 30 for continuously testing the extent of purity of the cleaned water.

Air can flow into the tank 33 through the air suction duct 32 which enters the filtering space 6 through the air filter basket 11. At the place where the air suction duct 32 enters the tank 33, there is an air suction valve 16 built in. This can preferably be a ball check valve which is in a closed position when the pressure of the cleaning space is below atmospheric pressure during regeneration. This ball check valve is also suitable for preventing the pressurized cleaned water from flowing out of the upper water space 8 of the tank 33.

The compressed air duct 31 which carries the compressed air—to make regneration more effective—from compressor 17 to the tank 33 through air suction duct 32 and air filter basket 11 is preferably connected to the air suction duct 32 through the air suction valve 16. There is also a shut-off valve 18 built into the air suction duct 32 to prevent the compressed air from flowing out of the apparatus instead of flowing into the tank 33. There is preferably a back-pressure valve 20 built into the compressed air duct 31 to prevent the air from flowing back to the direction of the compressor 17.

FIG. 2 shows a construction in which the filtering space 6 of the tank 33 is divided by perforated plates 36 and 37 into separate parts. The filter is divided into separated layers 7a, 7b and 7c and these layers cannot be mixed with one another. It is also possible that the different layers contain different fractions of the filter material.

The apparatus and the process of the present invention—according to the experiments—is suitable not only for deoiling oil-polluted water but also for cleaning other liquid containing other sorts of emulsified pollution. It also can be used advantageously as a treating stage for filtering softened water connected to a lime softener reactor, that is to say, to achieve the extent of purity required for ion-exchangers.

The apparatus according to the present invention can be favorably connected to water works for producing drinking or industrial water from the water of any kind from natural or artificial lakes or rivers.

Wat we claim is:

1. A process for cleaning contaminated raw water, comprising: introducing raw water and a flocculator into the reaction space of a pressure vessel, which vessel has said reaction space at the bottom thereof, a filter space above the reaction space and containing a filter made of particles of elastic, granular material, and a clean water space above the filter space so that the raw water passes through said three spaces, whereby pollution material contained in the raw water becomes enclosed by the cells of the floccules of the flocculator and the floccules become absorbed by the filter particles; removing accumulated pollution material from the filter particles by regenerating the filter with a fluid flowing from the clean water space through the filter space into the reaction space; checking the purity of the water leaving the clean water space; and adjusting the purity by varying the velocity of the raw water introduced into the reaction space, to thereby adjust compactness of the filter material in the filter space and thereby the percentage of voids in the filter.

2. The process according to claim 1, comprising checking the purity of the cleaned water by intermittent sampling.

3. The process according to claim 1, comprising checking the purity of the cleaned water continuously.

4. The process according to claim 1, wherein said filter is regenerated by draining raw water from the pressure vessel.

5. The process according to claim 1, wherein said filter is regenerated by pumping raw water out of the pressure vessel.

6. The process according to claim 4 or 5, comprising passing compressed air through said vessel from the top to the bottom to improve regeneration.

7. The process according to claim 1, comprising stirring up with air the filter particles during said regeneration so that pollution is removed from the surface of the particles; and flushing out with the help of said air sludge accumulated in said vessel.

8. The process according to claim 7, wherein said sludge is displaced from said vessel by compressed air so that the sludge and the particles of the filter are brought into a vortex motion to mix the particles of the filter and to press the polluting material out of the pores of the filter by compressing the filter particles against a filter plate.

* * * * *